US010059816B2

(12) United States Patent
Spijkerman

(10) Patent No.: US 10,059,816 B2
(45) Date of Patent: Aug. 28, 2018

(54) PROCESS FOR PREPARING A MASTERBATCH OF POLYMER ADDITIVE

(71) Applicant: Akzo Nobel Chemicals International B.V., Arnhem (NL)

(72) Inventor: Geesje Klasina Spijkerman, Deventer (NL)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/513,291

(22) PCT Filed: Sep. 22, 2015

(86) PCT No.: PCT/EP2015/071636
§ 371 (c)(1),
(2) Date: Mar. 22, 2017

(87) PCT Pub. No.: WO2016/046149
PCT Pub. Date: Mar. 31, 2016

(65) Prior Publication Data
US 2017/0342222 A1     Nov. 30, 2017

(30) Foreign Application Priority Data

Sep. 26, 2014  (EP) ..................................... 14186591

(51) Int. Cl.
C08J 3/20      (2006.01)
C08J 3/22      (2006.01)
(52) U.S. Cl.
CPC ............... *C08J 3/226* (2013.01); *C08J 3/203* (2013.01); *C08J 2323/06* (2013.01); *C08J 2323/12* (2013.01); *C08J 2325/06* (2013.01); *C08J 2333/20* (2013.01)
(58) Field of Classification Search
CPC ......... C08J 3/226; C08J 3/203; C08J 2323/06
See application file for complete search history.

(56) References Cited

U.S. PATENT DOCUMENTS

| 3,932,323 A | 1/1976 | Perry |
| 4,137,338 A * | 1/1979 | Gawrilow ................ A21D 2/16 426/601 |
| 4,319,848 A | 3/1982 | Lambertini et al. |
| 5,053,444 A | 10/1991 | Trotoir |
| 5,075,359 A * | 12/1991 | Castagna .................. C08J 3/226 524/115 |
| 5,516,476 A | 5/1996 | Haggard et al. |
| 6,284,814 B1 | 9/2001 | Gupta |
| 2003/0078340 A1* | 4/2003 | Fatnes ...................... C08F 10/00 525/55 |
| 2010/0330861 A1 | 12/2010 | Mor |
| 2014/0155505 A1 | 6/2014 | Sengupta et al. |
| 2015/0031535 A1* | 1/2015 | Xu .......................... A01N 53/00 504/100 |

FOREIGN PATENT DOCUMENTS

| CA | 2599237 A1 | 9/2006 |
| DE | 195 22 475 C1 | 9/1996 |
| EP | 0 259 960 A2 | 3/1988 |
| EP | 2 660 284 A1 | 11/2013 |
| GB | 1056507 | 1/1967 |
| JP | S51-151739 A | 12/1976 |
| JP | S51-151743 A | 12/1976 |
| JP | S61-239007 A | 10/1986 |
| JP | H06-239904 A | 8/1994 |
| JP | H08-143860 A | 6/1996 |

OTHER PUBLICATIONS

European Search Report issued in counterpart European Application No. 14186591.5 dated Apr. 14, 2015.
International Search Report and Written Opinion issued in counterpart International Application No. PCT/EP2015/071636 dated Mar. 3, 2016.
International Preliminary Report on Patentability issued in PCT/EP2015/071636 dated Aug. 31, 2016.
Masterbatch, Wikipedia the free encyclopedia, XP055252903, retrieved on Feb. 24, 2016.
"Technical Articles and Information About Colouring With Masterbatch," XP055252936, retrieved on Feb. 24, 2016.

* cited by examiner

*Primary Examiner* — Hannah J Pak
(74) *Attorney, Agent, or Firm* — McDonnell Boehnen Hulbert & Berghoff LLP

(57) ABSTRACT

Process for preparing a masterbatch comprising 20-90 wt % of a polymer additive dispersed in 10-80 wt % of a thermoplastic polymer, said process comprising the steps of: —providing the additive in liquid form, —optionally heating the additive, —adding solid particles of the thermoplastic polymer to the liquid additive, —heating the resulting mixture to a temperature in or above the melting temperature of the polymer, —treating the mixture with shaping equipment to form solid particles.

15 Claims, No Drawings

PROCESS FOR PREPARING A MASTERBATCH OF POLYMER ADDITIVE

This application is a national stage filing under 35 U.S.C. § 371 of PCT/EP2015/071636, filed Sep. 22, 2015, which claims priority European Patent Application No. 14186591.5, filed Sep. 26, 2014, the contents of which are each incorporated herein by reference in their entireties.

This invention relates to a process for the preparation of a masterbatch of polymer additive.

Polymer additives are added to polymers in order to improve the polymer's properties. Examples of such additives are anti-fogging agents, anti-stats, anti-slips, etc. These additives are generally dosed to the polymer in the form of a masterbatch: a relatively high concentration of additive dispersed in a polymer. The use of a masterbatch improves the dispersion of the additive in the final polymer and improves the ease of dosing of the additive to said polymer.

Commercial masterbatches are prepared by melting a polymer in an extruder and adding the additive to the molten polymer. This allows the preparation of masterbatches with additive concentrations up to about 20 wt %.

Such a process cannot be conducted in a stirred vessel; first of all because the high viscosity of the molten polymer prevents stirring of the reactor contents, and secondly because the polymer will melt on the reactor walls and flow to the bottom, thereby blocking the required heat exchange between the reactor walls and the reactor contents.

Furthermore, conventional extruder processes do not allow additive concentrations above about 20 wt % because of the huge viscosity differences between molten polymer and liquid additive. The residence time in an extruder generally varies between 1 and at most 5 minutes, which is too short for mixing large quantities of low viscosity additive with higher viscosity polymer.

The present invention relates to the reverse process: first providing an additive in liquid form, then adding the polymer, in solid form, to the molten additive. The polymer, being dispersed in the liquid additive is subsequently melted. This process allows for the incorporation of larger amounts of additive, leading to higher concentrated masterbatches. Furthermore, this process does not require extrusion; it can be done in simple vessels, which is cheaper and simpler than extrusion. In addition, masterbatches which are better free-flowing can be obtained.

A process which also blends a liquid additive with a solid polymer is disclosed in GB 1,056,507. However, in this process the polymer is not melted. As will be shown in the experimental section below, without melting the polymer, the additive cannot not be distributed in a homogeneous polymer phase. Instead, the additive is situated on the outside of the polymer particles, which leads to stickiness, inhomogeneity, and/or caking at increased temperature.

The present invention relates to a process for preparing a masterbatch comprising 20-90 wt % of a polymer additive dispersed in 10-80 wt % of a thermoplastic polymer, said process comprising the steps of:
  providing the additive in liquid form,
  optionally heating the additive,
  adding solid particles of the thermoplastic polymer to the liquid additive,
  heating the resulting mixture to a temperature in or above the melting range of the polymer, and
  treating the mixture with shaping equipment to form solid particles.

Polymer additives that can be applied in the present process include anti-static, anti-fog, anti-slip and anti-blocking agents, anti-oxidants, coupling agents, light stabilizers, and lubricants.

Examples of anti-oxidants include primary and secondary anti-oxidants. Examples of primary anti-oxidants are phenols, such as butylated hydroxytoluene (BHT), octadecyl-3-(3,5-di-tert.butyl-4-hydroxyphenyl)-propionate, and tetrakis [methylene-3 (3',5'-di-tert-butyl-4-hydroxyphenyl) propionate]methane; and hydroxylamines. Examples of secondary anti-oxidants are organophosphites, such as tris (2,4-di-tert-butylphenyl) phosphite and tris-nonylphenyl phosphite (TNPP); and thioesters.

Examples of coupling agents are maleic anhydride-grafted polyolefins and silanes.

Examples of light stabilizers are hindered amine light stabilisers (HALS); benzophenones, such as 2-hydroxy-4-methoxybenzophenone, 2-hydroxy-4-n-octoxybenzophenone, and 2,4-dihydroxy-4-n-dodecyloxybenzophenone); phenolesters, such as 3,5-di-t-butyl 4-hydrobenzoic acid n-hexadecyl ester; benzotriazoles; and triazines.

Examples of lubricants are metallic stearates; fatty amides; fatty bisamides; petroleum waxes; polyolefin waxes; mineral oils; and silicone oils.

Preferred polymer additives are anti-slip, anti-fog, and anti-static agents.

Even more preferred additives to be incorporated in the masterbatch according to the present invention are alkoxylated amines, amides, alkoxylated amides, glycerol esters, alkoxylated glycerol esters, and alkoxylated sorbitan esters.

The average number of alkoxy groups of the alkoxylated compounds is preferably in the range 1-30, more preferably 1-20, even more preferably 1-10, and most preferably 1-5 per alkoxy chain.

The alkoxy chains preferably contain either ethylene oxide groups, propylene oxide groups, or both ethylene oxide and propylene oxide groups.

Preferred alkoxylated amines have the general formula

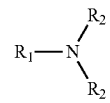

Alkoxylated amides include alkoxylated monoamides, alkoxylated bisamides, and alkoxylated polyamides.

Preferred alkoxylated monoamides have the general formula

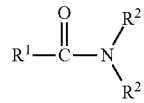

Alkoxylated bisamides preferably have the general formula

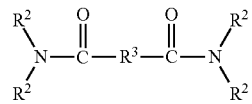

Preferred glycerol esters have the formula

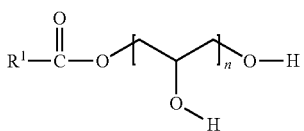

Preferred alkoxylated glycerol esters have the formula

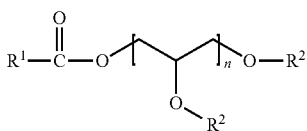

Preferred alkoxylated sorbitan esters have the formula

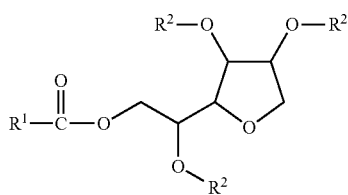

In all above formulae, $R^1$ is a saturated or unsaturated hydrocarbon chain with 11 to 21 carbon atoms, optionally substituted with —OH; —O—; —(C═O)—O—; —NH—; —Si—; —S—; —P—; —SO$_2$—; —S═O—; or —SO$_3$H containing groups, $R^2$ is independently selected from H, ethylene oxide chains, propylene oxide chains, ethylene oxide-propylene oxide bock- or random copolymer chains, provided that not every $R^2$ in each formula is H. The total number of ethylene oxide and propylene oxide per chain preferably is in the range 1-30, more preferably in the range 1-20, even more preferably 1-10, and most preferably 1-5. $R^3$ is a linear or branched alkanediyl chain with 2 to 6 carbon atoms, optionally substituted with —OH; —O—; ═O; —S—; —SO$_2$—; —Si—; or —P— containing groups, and n is an integer in the range 1-8, preferably 1-4, and most preferably 1-3.

If n>1, the (alkoxylated) glycerol ester is an (alkoxylated) polyglycerol ester.

More specific examples of suitable alkoxylated amines are ethoxylated tallow amine, ethoxylated hydrogenated tallow amine, ethoxylated coco amine, and ethoxylated octadecyl amine.

Amides include monoamides, bisamides, and polyamides. Examples of suitable amides are oleamide, erucamide, stearamide, ethylene bis(oleamide), ethylene bis(stearamide), and bis(2-hydroxyethyl) dodecanamide. Examples of suitable glycerol esters are (poly)glycerol monostearate, (poly) glycerol mono-oleate, and (poly)glycerol mono laurate.

Examples of suitable alkoxylated glycerol esters are ethoxylated (poly)glycerol monostearate, ethoxylated (poly) glycerol mono-oleate, ethoxylated (poly)glycerol monolaurate, propoxylated (poly)glycerol monostearate, propoxylated (poly)glycerol mono-oleate, and propoxylated (poly) glycerol monolaurate.

Examples of suitable sorbitan esters are sorbitan mono-oleate, sorbitan monostearate, and sorbinan monolaurate.

Examples of suitable alkoxylated sorbitan esters are ethoxylated sorbitan monostearate, ethoxylated sorbitan mono-oleate, ethoxylated sorbitan monolaurate, propoxylated sorbitan monostearate, and propoxylated sorbitan mono-oleate, and propoxylated sorbitan monolaurate.

The process according to the present invention can be performed in any type of stirred vessel. The residence time in said vessel is preferably at least 0.5 hour, more preferably at least 1 hour. Such residence times allow sufficient time for melting the polymer and obtaining a homogenous mixture of highly viscous polymer and low viscous additive. Preferably, the residence time is at most 6 hours, more preferably at most 4 hours.

Extruders, on the other hand, have a residence time that is much shorter (up to 5 minutes), which means that they are considered less suitable for the present process.

The vessel can be made of any suitable material, e.g. stainless steel or glass lined. Preferably, it has a a bottom valve. The use of baffles is recommended for obtaining higher shear.

Any suitable type of stirrer can be used. A preferred stirrer is an axial flow impeller, for example a turbine impeller.

The reactor should be able to be heated. Heating can be performed in various ways, e.g. using an oil bath, steam, or electrical heating.

At the start of the reaction, the additive has to be in liquid form. If the additive is not already liquid at room temperature, it has to be heated to above its melting temperature. Melting temperature is defined as the melting point or, if there is not clear melting point, the upper limit of the melting range.

If the additive is already liquid at room temperature, it may nevertheless be heated, for instance in order to lower its viscosity.

The thermoplastic polymer is then added to the liquid additive in the form of solid particles. The polymer can be added in one portion or in two or more portions.

In a preferred embodiment, the liquid additive is heated to a temperature in the range 80-150° C., more preferably 100-130° C. before the solid polymer is added. This allows the polymer to be surrounded by warm liquid additive immediately, resulting in heat transfer from the additive to the polymer.

Suitable thermoplastic polymers include polyethylene (PE), polypropylene (PP), random- and block-copolymers of ethylene and propylene, ethylene vinyl acetate copolymer (EVA), and polymers obtained from ethylene or propylene copolymerized with minimal amounts of other mono-olefinic monomers such as butene, isobutylene, acrylic acids, esters of acrylic acids, styrene, or combinations thereof, polybutadiene (PB), styrene acrylonitrile (SAN), acrylonitrile butadiene styrene (ABS), and polystyrene (PS).

Polyethylene includes high density polyethylene (HDPE; defined by a density of greater or equal to 0.941 g/cm$^3$), medium density polyethylene (MDPE; defined by a density range of 0.926-0.940 g/cm$^3$), linear low density polyethylene (LLDPE; defined by a density range of 0.915-0.925 g/cm$^3$), low density polyethylene (LDPE; defined by a density range of 0.910-0.940 g/cm$^3$), and very low density polyethylene (VLDPE; defined by a density range of 0.880-0.915 g/cm$^3$).

Preferred thermoplastic polymers to be used in the process of the present invention include polypropylene, polyethylene, polystyrene, polybutadiene, SAN, and EVA. Said EVA preferably has a vinyl acetate content of 3-40%.

After adding the solid polymer to the liquid additive, the resulting mixture is heated to a temperature within or above the melting range of the polymer. This allows the mixture to be blended until the additive and the polymer form a single phase system. A single phase system is a mixture wherein additive and polymer form a homogeneous and transparent or translucent mixture. Whether or not a mixture forms a single phase can be determined by visual inspection.

The melting range of the polymer differs per polymer and is easily established by the skilled person. In general, the temperature to which the polymer-additive mixture is to be heated will be within the range 100-250° C., more preferably 120-230° C., and most preferably 150-225° C.

As a rough guidance, HDPE generally melts at temperatures in the range 110-140° C., MDPE in the range 120-130° C., LDPE in the range 100-130° C., LLDPE In the range 115-140° C., and polypropylene in the range 130-175° C., depending on whether it is a homo- or copolymer and depending on tacticity. Polystyrene generally melts in the range 105-135° C., and SAN and ABS in the range 100-130° C.

The blend is subsequently shaped to form solid particles. Shaping can be done with any suitable shaping equipment. For instance by creating strands that are subsequently granulated. Another method involves the deposition of the molten mixture on a cooling belt, followed by breaking the solidified mixture into flakes. Another suitable shaping equipment is a pastillator.

The process is preferably conducted under inert atmosphere, more preferably under nitrogen or carbon dioxide atmosphere, to prevent degradation of the polymer.

The process results in a masterbatch comprising 20-90 wt %, preferably 30-80 wt %, even more preferably 40-80 wt %, and most preferably 50-80 wt % of the additive in the thermoplastic polymer.

The masterbatch comprises 10-80 wt %, preferably 20-70 wt %, even more preferably 20-60 wt %, and most preferably 20-50 wt % of the polymer.

In addition to additive and thermoplastic polymer, the masterbatch can contain additional compounds. The additional compounds can be added to the liquid additive together with the thermoplastic polymer.

The resulting masterbatch can be used to add the additive to a polymer that requires the additive to improve its properties. Examples of such properties are the tendency for becoming electrostatically charged, the tendency to form water droplets on its surface under humid conditions, the tendency to block films, degrade under high temperatures or sunlight, and the tendency to be incompatible with fillers or other polymers. These tendencies can be reduced by using, respectively, an anti-static, anti-fog, anti-blocking, or anti-slip agent, an anti-oxidant, a UV stabilizer, or a coupling agent as the additive.

Examples of polymers to which the masterbatch resulting from the process of the present invention can be added are the thermoplastic polymers mentioned above.

The polymer present in the masterbatch should, of course, be a polymer that can be tolerated in the polymer in which the masterbatch is to be incorporated. Preferably, both polymers are the same or of the same type.

EXAMPLES

Example 1

Masterbatches with different additives and polymers were prepared according to the following general procedure. The entire procedure was performed under nitrogen atmosphere.

The additive was melted. A reactor containing the molten additive and provided with a 6-blade turbine stirrer was heated to 100° C. Solid polymer powder was added while stirring and the resulting mixture was stirred and heated to the temperature indicated in Table 1.

As soon as the mixture, by visual inspection, was considered to be of a single phase, the reactor was unloaded through a die, thereby creating strands that were subsequently granulated.

Different additives, polymers, and temperatures were used: see Table 1.

TABLE 1

| Additive | Polymer | Additive concentration (%) | T (° C.) | Time required for obtaining single phase |
|---|---|---|---|---|
| Ethoxylated tallow amine (Armostat® 300) | HDPE | 73-77 | 225 | 2.5 |
| Ethoxylated tallow amine (Armostat® 300) | LDPE | 48-52 | 225 | 2.5 |
| Ethoxylated tallow amine (Armostat® 300) | PP | 78-82 | 195 | 1.5 |
| Ethoxylated hydrogenated tallow amine (Armostat® 600) | | 73-77 | 195 | 1.5 |
| Ethoxylated octadecyl amine (Armostat® 1800) | | 73-77 | 195 | 1.5 |
| Ethoxylated coco amine (Armostat® 400) | | 73-77 | 195 | 1.5 |
| Ethoxylated coco amine (Armostat® 400) | SAN | 48-52 | 195 | 1.5 |
| Ethoxylated coco amine (Armostat® 400) | PS | 48-52 | 195 | 1.5 |

Comparative Example

Armostat® 300 was melted and pumped into the reactor of Example 1. The reactor was heated to 100° C. Solid polypropylene powder was added while stirring. After 24 hours of stirring, still no homogeneous mixture was obtained. This shows that melting of the polymer is an important and indispensable step in the process of the present invention.

After heating the contents to 200° C., a homogeneous mixture was obtained.

The invention claimed is:

1. A process for preparing a masterbatch comprising 20-90 wt % of a polymer additive dispersed in 10-80 wt % of a thermoplastic polymer, said process comprising
   providing the polymer additive in liquid form,
   optionally heating the liquid polymer additive,
   dispersing solid particles of the thermoplastic polymer in the liquid polymer additive to form a mixture,
   heating the mixture to a temperature in or above the melting temperature range of the thermoplastic to form a single phase system,
   treating the mixture with shaping equipment to form solid particles of said mixture,
   wherein the addition of solid particles of thermoplastic polymer to the liquid polymer additive and the heating of the mixture are performed in a stirred vessel.

2. The process according to claim 1 wherein in the process is performed under inert atmosphere.

3. The process according to claim 1 wherein the residence time of the mixture in said stirred vessel is at least 0.5 hour.

4. The process according to claim 3 wherein the residence time is at least 1 hour.

5. The process according to claim 1 wherein the liquid polymer additive is heated to a temperature in the range 80-150° C. prior to the addition of solid particles of thermoplastic polymer.

6. The process according to claim 1 wherein the polymer additive is selected from the group consisting of alkoxylated amines, amides, alkoxylated amides, glycerol esters, alkoxylated glycerol esters, and alkoxylated sorbitan esters.

7. The process according to claim 6 wherein the polymer additive is an alkoxylated amine having the general formula

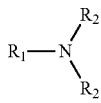

wherein $R^1$ is a saturated or unsaturated hydrocarbon chain with 11 to 21 carbon atoms, optionally substituted with —OH; —O—; —(C═O)—O—; —NH—; —Si—; —S—; —P—; —SO$_2$—; —S═O—; or —SO$_3$H containing groups, and $R^2$ is independently selected from the group consisting of H, ethylene oxide chains, propylene oxide chains, and ethylene oxide-propylene oxide bock- or random copolymer chains, provided that at least one $R^2$-group is other than H, and the total number of ethylene oxide and propylene oxide per chain is in the range 1-30.

8. The process according to claim 6 wherein the polymer additive is an alkoxylated amide having the general formula

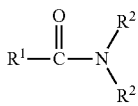

wherein $R^1$ is a saturated or unsaturated hydrocarbon chain with 11 to 21 carbon atoms, optionally substituted with —OH; —O—; —(C═O)—O—; —NH—; —Si—; —S—; —P—; —SO$_2$—; —S═O—; or —SO$_3$H containing groups, and $R^2$ is independently selected from the group consisting of H, ethylene oxide chains, propylene oxide chains, and ethylene oxide-propylene oxide bock- or random copolymer chains, provided that not every $R^2$ in each formula is H, and the total number of ethylene oxide and propylene oxide per chain is in the range 1-30.

9. The process according to claim 6 wherein the polymer additive is an alkoxylated amide having the general formula

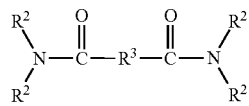

wherein $R^2$ is independently selected from the group consisting of H, ethylene oxide chains, propylene oxide chains, and ethylene oxide-propylene oxide bock- or random copolymer chains, provided that at least one $R^2$-group is other than H, the total number of ethylene oxide and propylene oxide per chain is in the range 1-30, and $R^3$ is a linear or branched alkanediyl chain with 2 to 6 carbon atoms, optionally substituted with —OH; —O—; ═O; —S—; —SO$_2$—; —Si—; or —P— containing groups.

10. The process according to claim 6 wherein the polymer additive is an alkoxylated glycerol ester having the formula

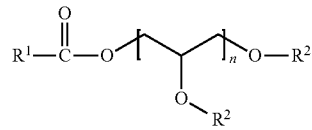

wherein $R^1$ is a saturated or unsaturated hydrocarbon chain with 11 to 21 carbon atoms, optionally substituted with —OH; —O—; —(C═O)—O—; —NH—; —Si—; —S—; —P—; —SO$_2$—; —S═O—; or —SO$_3$H containing groups, and $R^2$ is independently selected from the group consisting of H, ethylene oxide chains, propylene oxide chains, and ethylene oxide-propylene oxide bock- or random copolymer chains, provided that at least one $R^2$-group is other than H, the total number of ethylene oxide and propylene oxide per chain is in the range 1-30, and n is an integer in the range 1-8.

11. The process according to claim 6 wherein the polymer additive is an alkoxylated sorbitan ester have the formula

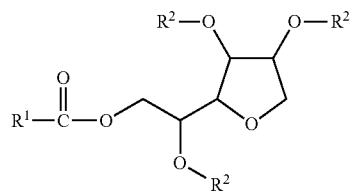

wherein $R^1$ is a saturated or unsaturated hydrocarbon chain with 11 to 21 carbon atoms, optionally substituted with —OH; —O—; —(C═O)—O—; —NH—; —Si—; —S—; —P—; —SO$_2$—; —S═O—; or —SO$_3$H containing groups, and $R^2$ is independently selected from the group consisting of H, ethylene oxide chains, propylene oxide chains, and ethylene oxide-propylene oxide bock- or random copolymer chains, provided that at least one $R^2$-group is other than H, the total number of ethylene oxide and propylene oxide per chain is in the range 1-30.

12. The process according to claim 1 wherein the masterbatch contains 50-80 wt % of the polymer additive and 20-50 wt % of the thermoplastic polymer.

13. The process according to claim 1 wherein the mixture of thermoplastic polymer and liquid polymer additive is heated to a temperature in the range 150-250° C.

14. The process according to claim 1 wherein the thermoplastic polymer is selected from the group consisting of polypropylene, polyethylene, polystyrene, polybutadiene, ethylene-vinyl acetate copolymer, and styrene acrylonitrile.

15. The process according to claim 5 wherein the liquid polymer additive is heated to a temperature in the range 100-130° C. prior to the addition of solid particles of thermoplastic polymer.

* * * * *